(12) United States Patent
Behr

(10) Patent No.: US 7,805,847 B2
(45) Date of Patent: Oct. 5, 2010

(54) SIGHTING SYSTEM AND RANGE FINDER FOR AN ARCHERY BOW

(76) Inventor: Joseph R. Behr, 1931 Welltown Rd., Clear Brook, VA (US) 22624

( * ) Notice: Subject to any disclaimer, the term of this patent is extended or adjusted under 35 U.S.C. 154(b) by 126 days.

(21) Appl. No.: 12/357,675

(22) Filed: Jan. 22, 2009

(65) Prior Publication Data

US 2009/0307914 A1    Dec. 17, 2009

Related U.S. Application Data

(60) Provisional application No. 61/131,843, filed on Jun. 13, 2008.

(51) Int. Cl.
*F41G 1/467* (2006.01)
*F41G 1/01* (2006.01)

(52) U.S. Cl. .............. 33/265; 124/87; 124/90
(58) Field of Classification Search .......... 33/265; 124/87, 90, 91
See application file for complete search history.

(56) References Cited

U.S. PATENT DOCUMENTS

| | | | | |
|---|---|---|---|---|
| 3,010,447 A | * | 11/1961 | Roemer | 124/91 |
| 3,590,489 A | * | 7/1971 | Saunders | 33/265 |
| 4,385,448 A | * | 5/1983 | Burkey | 33/265 |
| 4,656,994 A | | 4/1987 | Jenks | |
| 5,016,603 A | | 5/1991 | Tentler | |
| 5,086,567 A | * | 2/1992 | Tutsch | 33/265 |
| 5,137,007 A | | 8/1992 | Shoemake et al. | |
| 5,850,700 A | * | 12/1998 | Capson et al. | 33/265 |
| 6,131,295 A | | 10/2000 | Cranston | |
| 6,237,584 B1 | | 5/2001 | Sims | |
| 6,519,859 B2 | | 2/2003 | Beshires | |
| 6,539,637 B1 | | 4/2003 | Hollabaugh | |
| 6,560,884 B1 | * | 5/2003 | Afshari | 33/265 |
| 6,761,158 B2 | | 7/2004 | Wright | |
| 7,266,896 B1 | | 9/2007 | White | |
| 2003/0019118 A1 | | 1/2003 | Wilson | |
| 2003/0046820 A1 | * | 3/2003 | Rager | 33/265 |
| 2008/0163503 A1 | | 7/2008 | Priebe | |
| 2009/0165767 A1 | * | 7/2009 | Parrish et al. | 124/90 |

* cited by examiner

*Primary Examiner*—G. Bradley Bennett
(74) *Attorney, Agent, or Firm*—Wood, Herron & Evans, L.L.P.

(57) ABSTRACT

A sighting system for use on an archery bow includes a sighting pin defining a front focus point and a plurality of contact knocks coupled to the bow string. An archer adjusts the distance of a shot by positioning a reference feature relative to a contact knock while placing the sighting pin on a target. A range finder for determining a distance to the target includes a sighting pin having a focus point and first and second yardage bars on opposite sides of the sighting pin. The first and second yardage bars are configured to be located relative to known features of the target at certain distances from the target.

12 Claims, 7 Drawing Sheets

US 7,805,847 B2

SIGHTING SYSTEM AND RANGE FINDER FOR AN ARCHERY BOW

CROSS-REFERENCE TO RELATED APPLICATIONS

This application claims the benefit of U.S. Provisional Patent Application Ser. No. 61/131,843, filed Jun. 13, 2008 (pending) the disclosure of which is fully incorporated by reference herein.

TECHNICAL FIELD

This application relates to archery bows, and more specifically, to archery sights with a front-mounted sighting pin.

BACKGROUND

On hunting compound bows and similar archery bows, a sight is utilized to aim a shot at a target. A typical sighting system includes a front pin sight mounted on the bow body and a peep sight mounted on the bow string. These sighting systems include a plurality of pins in the front pin sight, each pin representing a different target distance for the shot. The archer would then look through the peep sight at the appropriate pin for the estimated distance and details of a shot, including whether the shot was aimed from an elevated position over the target. The peep sight serves as a back pivot point for shots of varying distances in this sighting system. The peep sight limits the archer's field of view, and target distances are limited to the number of sighting pins included in the front pin sight. Adding too many sighting pins creates confusion as to which pin corresponds to its associated distance. Even with a limited number of pins, it can be difficult for an archer to select the appropriate pin for the distance of a desired shot. These difficulties increase when a shot must be aimed quickly, as is often the case in hunting.

Alternative sighting systems have been designed with a single front pin as a front pivot point for the sighting system. These systems include a plurality of apertures mounted at a distance behind the front pin. The multiple apertures work in a similar manner as the multiple sight pins, allowing an archer to adjust the length of the shot by looking through a particular aperture. These alternative sighting systems eliminate the need for a peep sight on the bow string. However, these systems are generally bulky and heavy when placed on the bow body. Furthermore, the accuracy of a shot is decreased by the closeness of the two focus points, i.e., the aperture and the front pin. Single front pin sights without apertures are also used, but these sighting systems can only be used for a single distance without adjustment. Accordingly, it would be desirable to create an improved sighting system for archery bows that overcomes these and other shortcomings of existing sighting systems.

SUMMARY

A sighting system is provided for use with an archery bow having a bow body and a bow string. The sighting system includes a sighting pin adapted to be coupled to a bow body and a plurality of contact knocks adapted to be attached to the bow string. The sighting pin defines a front focus point. An archer can adjust the distance of a shot by locating a reference feature on the archer relative to one of the contact knocks while keeping the sighting pin on a target. In one aspect, the sighting system includes an alignment bar spaced from the bow body and located adjacent to the sighting pin.

The contact knocks of the sighting system include a knock body and an aperture formed in the knock body. The aperture snugly receives the bow string. Each contact knock is made from a resilient rubber material. A contact knock may include a tightening pin and a tightening string disposed through the knock body and around the tightening pin. The tightening string is adapted to tighten the contact knock on the bow string when the tightening string is tensioned through the knock body. The plurality of contact knocks may share a common tightening string or each contact knock may have its own tightening string.

An archery bow is also provided. The bow includes a bow body, a bow string, and a sighting system. The sighting system includes a sighting pin coupled to the bow body and a plurality of contact knocks attached to the bow string. As in the previous sighting system, an archer adjusts the distance of a shot by locating a reference feature on the archer relative to one of the contact knocks while keeping the sighting pin on a target.

A range finder is also disclosed. The range finder includes a sighting pin having a focus point and two yardage bars on opposite sides of the sighting pin. The yardage bars are configured to be located relative to known features of a target at certain distances from the target. In one embodiment, the yardage bars are configured to align with the front and back legs of a deer viewed broadside through the range finder at a distance of approximately 30 yards from the archer. Additionally, the yardage bars can be painted a bright color to make the yardage bars stand out clearly when placed on a target. The range finder may also include a brightly-colored element attached to the sighting pin and defining a focus point. The range finder may be utilized alone or in conjunction with the sighting system or bow described above.

A method of shooting a bow is further disclosed. The method comprises drawing a bow string to a fully drawn position, positioning a reference feature relative to a contact knock on the bow string, placing a sighting pin coupled to a bow body on a target, and releasing the bow string to shoot at the target. The method may further include estimating a distance to the target with a range finder prior to releasing the bow string. In these embodiments, estimating the distance to the target may include aligning yardage bars with known features of the target.

DETAILED DESCRIPTION OF THE ILLUSTRATIVE EMBODIMENTS

Figure 1:
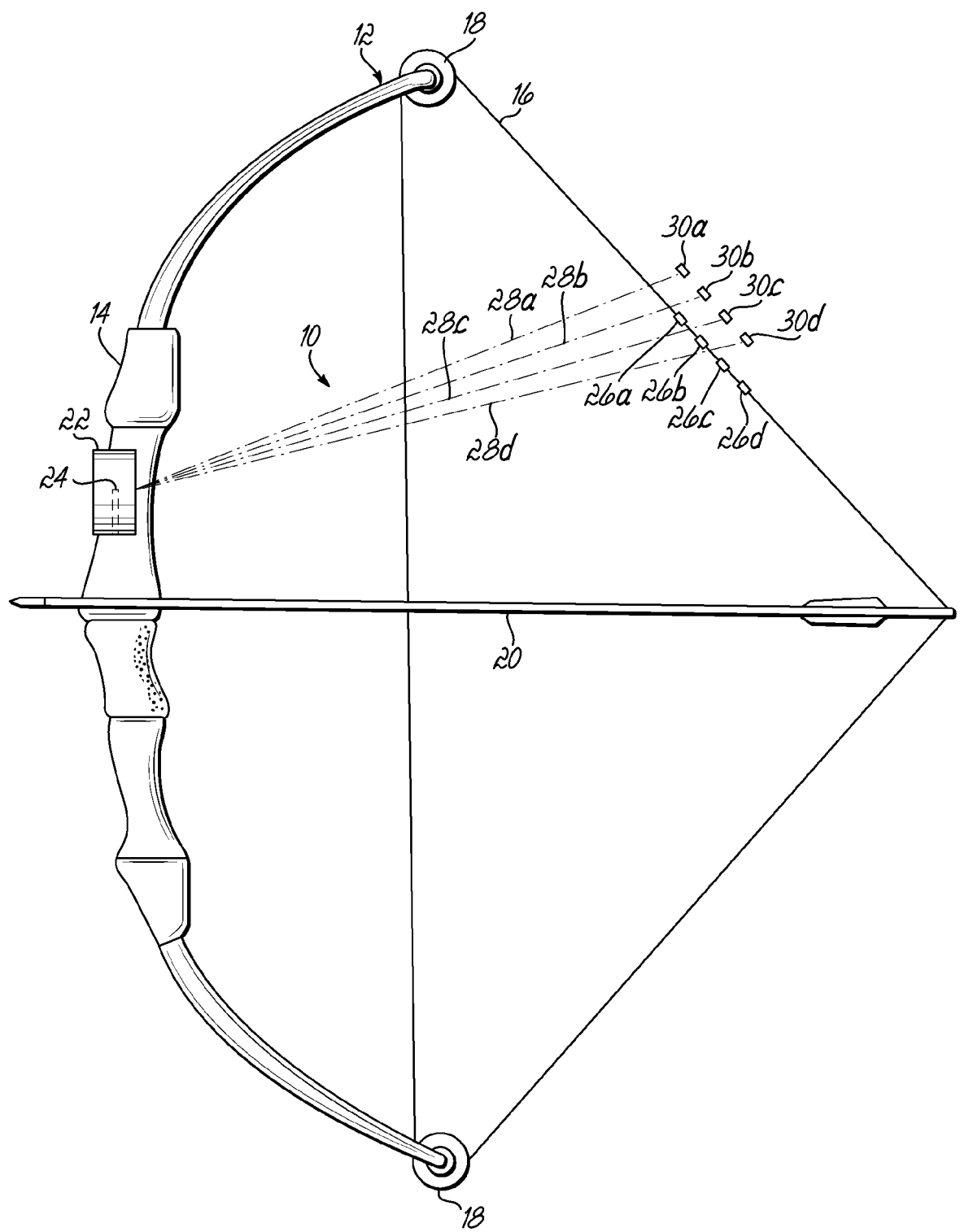
FIG. 1 is a side view of a sighting system installed on a bow in accordance with an embodiment of the invention.

One embodiment of a sighting system 10 for use with a bow 12 is illustrated in FIG. 1. The bow 12 includes a bow body 14 and a bow string 16. In an exemplary embodiment, the bow 12 may be a compound bow having pulleys 18 used to tension the bow string 16 against the bow body 14. However, one of ordinary skill in the art will understand that the sighting system 10 is not limited to any particular type of bow 12, but may be used with a wide variety of bows. In FIG. 1, the bow 12 is displayed in a fully drawn position with an arrow 20 and bow string 16 pulled back into a shooting position. The sighting system 10 includes a sight body 22 attached to the bow body 14, a sighting pin 24 disposed within the sight body 22, and a plurality of contact knocks 26 attached to the bow string 16. In one embodiment, there may be four contact knocks 26a, 26b, 26c, 26d disposed on the bow string 16. Those of ordinary skill in the art will realize, however, that more or fewer contact knocks 26 may be disposed on the bow string 16 depending on the application, desires of the user, or other factors.

The sight body 22 may include an elongate tube attached to the bow body 14 by clamping, adhesive, screws, or other connecting elements known in the art. The elongate tube of the sight body 22 protects the sighting pin 24 from incidental external forces that could break or otherwise displace the sighting pin 24. The plurality of contact knocks 26a, 26b, 26c, 26d define a corresponding plurality of sight lines 28a, 28b, 28c, 28d drawn from the sighting pin 24 to corresponding view origin points 30a, 30b, 30c, 30d spaced generally above the contact knocks 26a, 26b, 26c, 26d. Depending on the length of shot or target distance desired, an archer 31 aligns a reference feature 32, such as a tip of the nose, an upper lip, or a chin, on or relative to one of the contact knocks 26 (e.g., see FIG. 4). For example, if an archer 31 places the reference feature 32 on or relative to contact knock 26a, the archer's eyes 33 will be located at the view origin point 30a and the vertical alignment of the shot is set by sight line 28a. For a shorter shot, the archer 31 can move his reference feature 32 down to the next contact knock 26b, changing the angle of the shot and the sight line to sight line 28b. In a similar manner, shorter target distances may be achieved by placing reference feature 32 on contact knocks 26c, 26d, resulting in sight lines 28c, 28d, respectively. For each of the target distances, the sighting pin 24 defines a front focus point 34 for sight lines 28 and the resulting shots.

Figure 2:
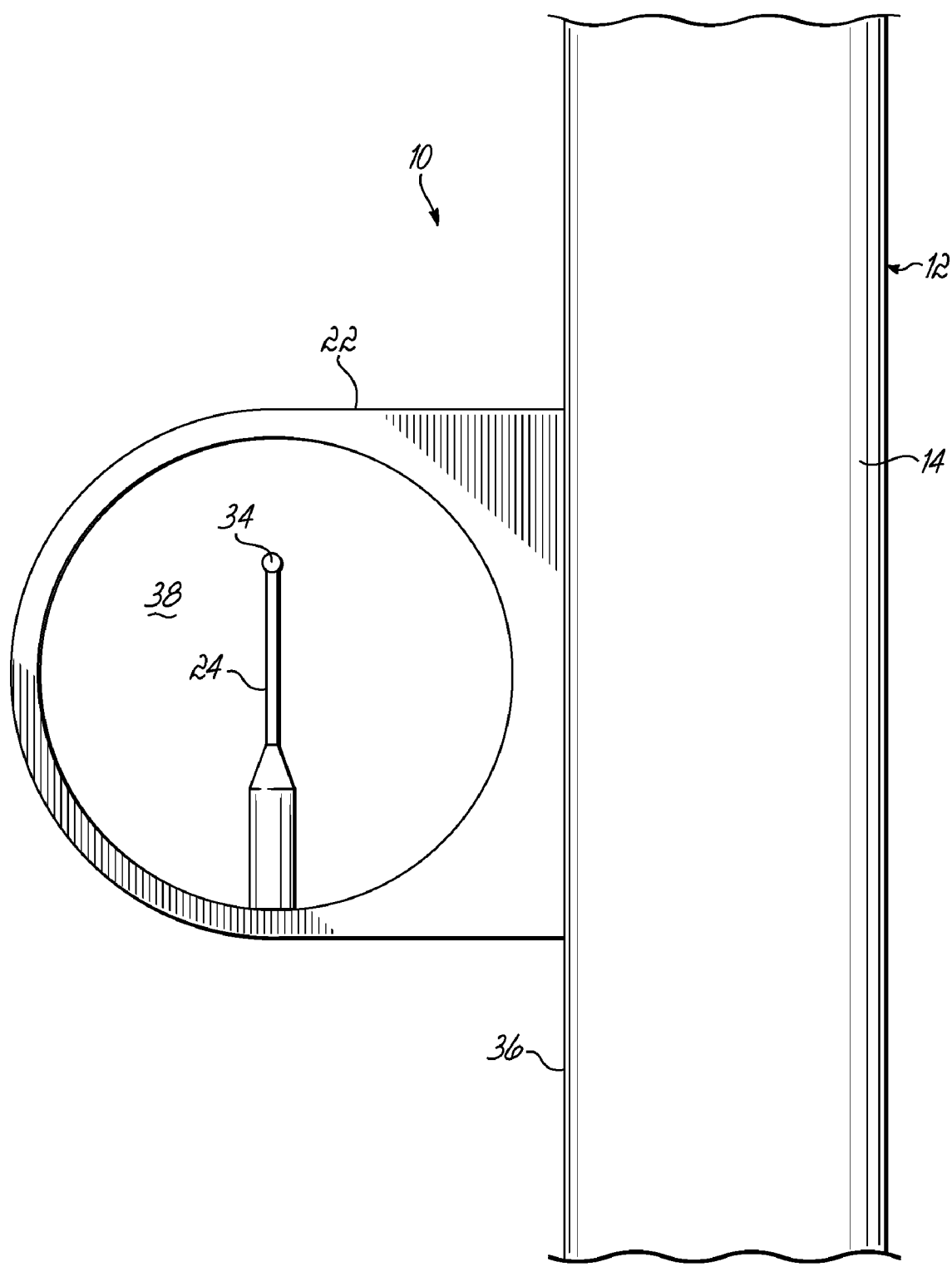
FIG. 2 is a front view of a sight body and sighting pin of the sighting system shown in FIG. 1.

With reference to FIG. 2, further details of the sighting system 10 are provided. The bow body 14 includes a first side 36 on one side of the bow 12. The sight body 22 is attached to this first side 36, for example, in a manner described above, and protrudes away from the bow body 14 to one side thereof. The sight body 22 defines a sighting window 38 containing the sighting pin 24. In one embodiment, the sighting window 38 may be circular, but other shapes may also be used. The front focus point 34 may operate as a front pivot point for shots at a target and may be located at the top of the sighting pin 24 in an exemplary embodiment. However, the front focus point 34 may also be located at other positions on the sighting pin 24. An archer 31 looks through the sighting window 38 and aims at a target by placing the front focus point 34 on the target. While the bow body 14, sight body 22, and sighting pin 24 are usually black or a dark neutral color, the front focus point 34 may be brightly colored to facilitate an archer's focus on the front focus point 34 and target. Furthermore, the front focus point 34 remains the same for each of the shots described above using different contact knocks 26 and corresponding sight lines 28. This front focus point 34 operating as a front pivot point is one aspect that differentiates the sighting system 10 of this embodiment from alternative designs including back pivot points located, for example, on a peep sight attached to the bow string.

Figure 3:
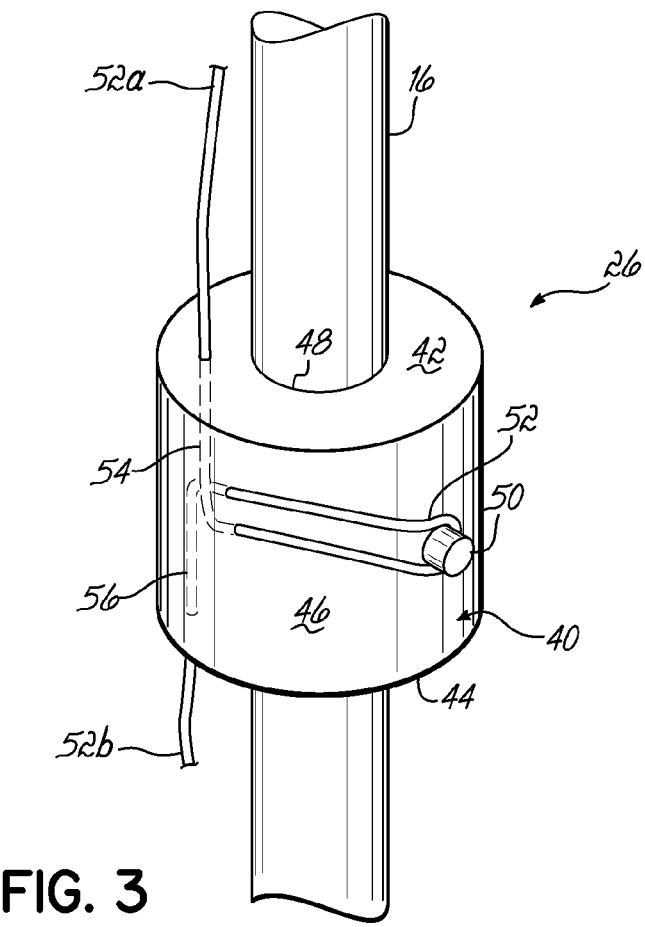
FIG. 3 is a front perspective view of a contact knock of the sighting system shown in FIG. 1.

As discussed above, one or more contact knocks 26 may be disposed around the bow string 16, as shown in detail in FIG. 3. The contact knock 26 includes a knock body 40, which may be generally tube-shaped, including an upper surface 42, a lower surface 44, and a side surface 46 extending therebetween. The knock body 40 is preferably formed from an elastic material (e.g., rubber), which advantageously dampens the vibrations of bow string 16 after a shot. However, the knock body 40 could be formed from metal, plastic, synthetic material, or other suitable materials as well. As shown in FIG. 3, the contact knock 26 includes an aperture 48 through knock body 40, substantially the size of the bow string 16 and configured to tightly or snugly receive the bow string 16 therein. In one embodiment, the knock body 40 may be continuous, such that each contact knock 26 is threaded onto the end of bow string 16 when bow string 16 is removed from the bow body 14. While maintaining the position of the contact knock 26 on the bow string 16 during normal use, the snug engagement between the aperture 48 and the bow string 16 allows for the contact knock 26 to slide along the length of bow string 16 during installation.

In some applications, it may be desirable to further secure the contact knocks 26 to the bow string 16 to, for example, prevent incidental movement of the contact knocks 26 which may throw the sighting system 10 out of calibration (discussed in more detail below). In this regard, the contact knock 26 may further include a tightening pin 50 and tightening string 52. The tightening pin 50 is typically a rigid pin (e.g., metal) permanently attached to knock body 40. The tightening string 52 may be inserted into a first passage 54 in the knock body 40 extending from an opening in the upper surface 42 to an opening in the side surface 46. The tightening string 52 is then looped around tightening pin 50. The tightening string 52 is then threaded through a second passage 56 in the knock body 40 extending from another opening in the side surface 46 to an opening in the lower surface 44. The tightening string 52 crosses over itself within the first passage 54 and second passage 56 as shown.

Pulling each end 52a, 52b of the tightening string 52 away from contact knock 26 creates tension in the tightening string 52 and a contraction force on the knock body 40. The knock body 40 therefore tightens around the bow string 16, securing the position of the contact knock 26 relative to the bow string 16. One tightening string 52 can be used on the entire plurality of contact knocks 26a, 26b, 26c, 26d. Alternatively, each contact knock 26 may include a dedicated tightening string 52. Once the contact knocks 26 are located in their desired position, the tightening string 52 may be tensioned and the ends of the tightening string 52a, 52b cut or tied off. Alternatively, the contact knocks 26 may be permanently secured onto the bow string 16 by applying rubber paint (not shown) to the bow string 16 at the desired location for the contact knock 26. The rubber paint acts as a semi-permanent adhesive between the bow string 16 and the contact knock 26.

Figure 4:
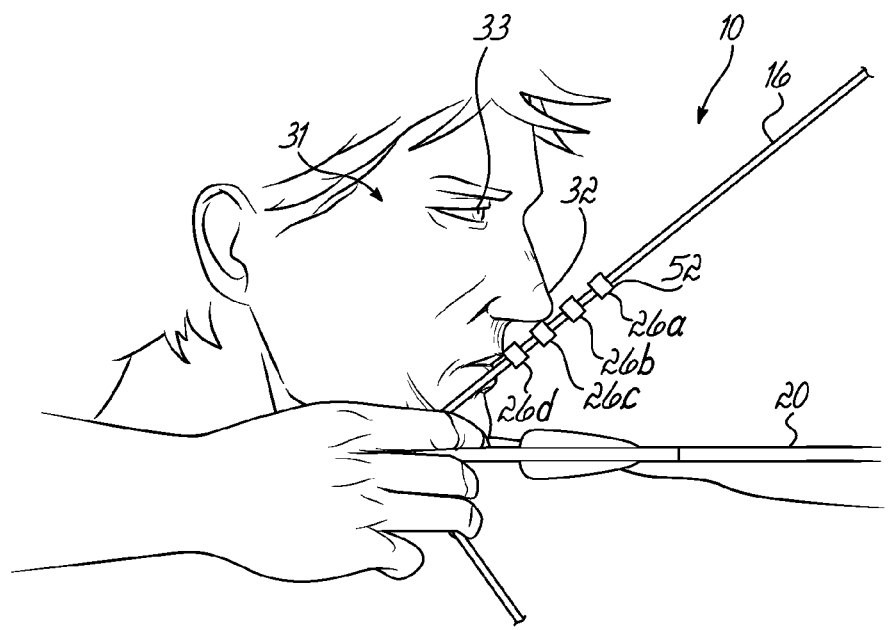
FIG. 4 is a side view of an archer aligning his nose with the contact knocks of the sighting system shown in FIG. 1.

Also illustrated in FIG. 4 is an archer 31 using the sighting system 10 by placing his nose, a reference feature 32, on or relative to a desired contact knock 26c. As discussed previously, the corresponding view origin point 30c located at the archer's eyes 33 then establishes the sight line 28c and length of the shot. In alternative arrangements, the reference feature 32 could be the lips or chin of the archer. For further accuracy, an archer 31 can wear a hat (e.g., baseball cap not shown) and touch the brim of the hat to the bow string 16 when lining up a shot. Alternatively, the archer 31 could place the reference feature 32 on or relative to the tightening pin 50 of a contact knock 26 for further precision and consistency. As long as the archer consistently uses the same reference feature 32 and calibrates the sighting system 10 for that reference feature 32, the aiming of shots for different distances should remain accurate.

To calibrate and install the sighting system 10, an archer 31 first threads the plurality of contact knocks 26 onto the bow string 16 and replaces the bow string 16 on the bow body 14. With the bow 12 fully drawn, the archer 31 puts the selected reference feature 32 (e.g., nose) relative to the bow string 16 at a comfortable position and slides the lowest contact knock 26d relative to the location of the reference feature 32. After tightening the lowest contact knock 26d onto the bow string 16 and temporarily attaching the sight body 22 to the bow body 14, the archer 31 verifies that the sighting system 10 is accurate from a target distance of around 10 to 20 yards. Once the sight body 22 is located in the correct place on the bow body 14 for accurate shots from 20 yards or fewer, the archer 31 locks the sight body 22 into a permanent position on the bow 12 as described previously. The next contact knock 26c is then placed about 0.5 inches above the lowest contact knock 26d. The archer 31 then verifies the shot accuracy using this contact knock 26c for an approximately 30 yard target distance, and locks the contact knock 26c into the correct position on the bow string 16 once the shot is accurate. The archer 31 continues this process for the other contact knocks 26a, 26b. By way of example, the contact knocks 26a, 26b, 26c, 26d illustrated in FIG. 4 may be calibrated for target distances of 50 yards, 40 yards, 30 yards, and 20 yards, respectively. Those of ordinary skill in the art will recognize, however, that different numbers of contact knocks 26 and different ranges of target distances may be accommodated by following this calibration procedure when installing the sighting system 10 on a bow 12.

Figure 5:
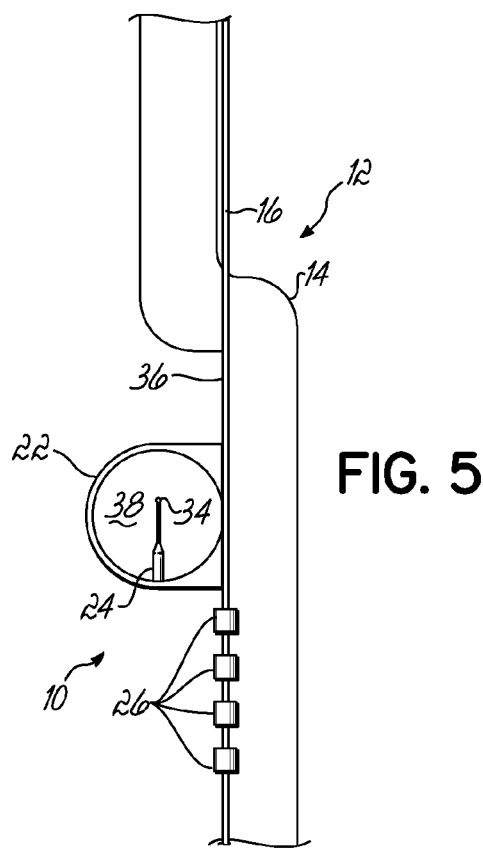
FIG. 5 is a front view of the sighting system and fully drawn bow of FIG. 1, where the bow string is aligned with the bow body.

FIG. 5 illustrates the sighting system 10 and bow 12 from an archer's perspective while the bow 12 is fully drawn. As provided above, the archer 31 aligns a shot vertically by placing a reference feature 32 on a contact knock 26 for the appropriate target distance, and looking through the sight body 22 so that the front focus point 34 of the sighting pin 24 is placed on the target. To align the shot horizontally, the bow string 16, when fully drawn, may be lined up with the first side 36 of the bow body 14 as shown. Accordingly, and as shown in FIG. 5, the bow 12 is in proper horizontal alignment and is ready for an accurate shot according to the knock calibration. While horizontal alignment may be achieved using the first side 36 of bow body 14 as a reference, those of ordinary skill in the art will recognize that other features may be used to ensure proper horizontal alignment.

Figure 6:
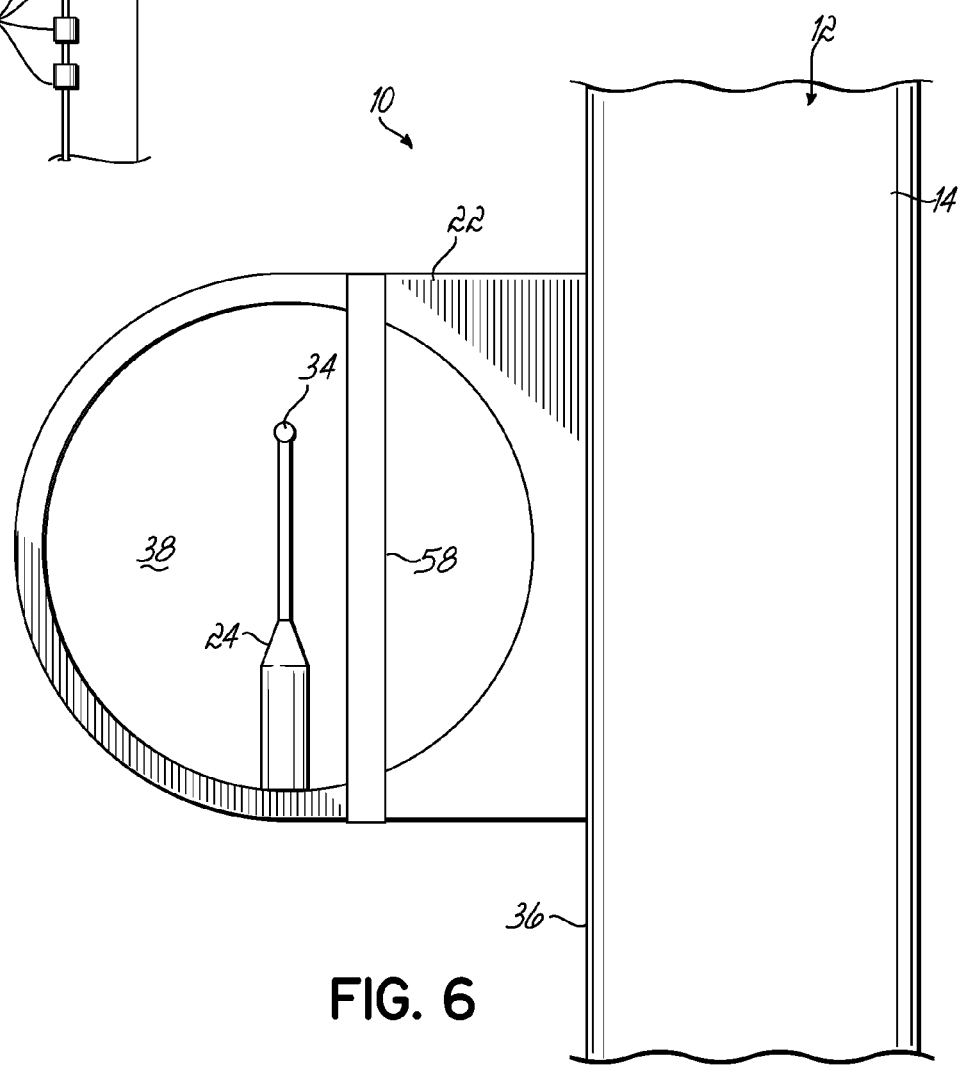
FIG. 6 is a front view of an alternative embodiment of the sight body of FIG. 2, including an alignment bar.
Figure 7:
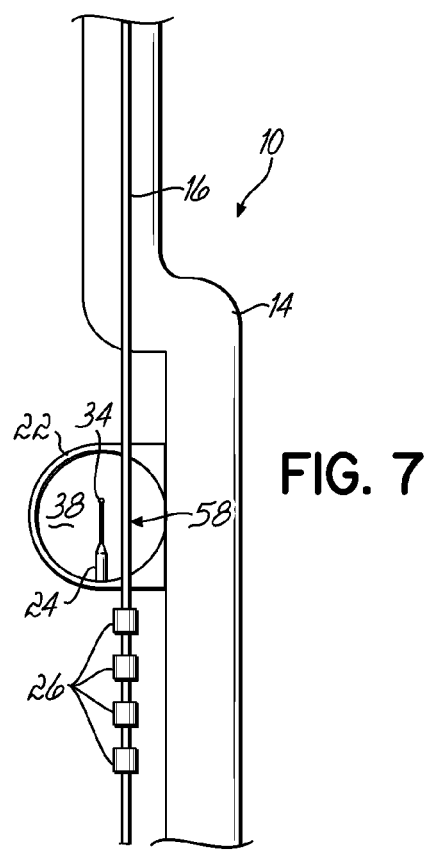
FIG. 7 is a front view of the sighting system and fully drawn bow of FIG. 2, where the bow string is aligned with the alignment bar.

In this regard, an alternative embodiment of the sighting system 10 is illustrated in FIGS. 6-7, with like reference numerals referring to similar elements from the embodiment of FIGS. 1-5. In this embodiment, the sight body 22 includes an alignment bar 58 extending across the sighting window 38. The alignment bar 58 may be vertically oriented and positioned to be generally horizontally spaced a short distance from sighting pin 24. In this embodiment, an archer 31 aligns a shot vertically in the same manner described above. However, an archer 31 now aligns a shot horizontally by lining up the bow string 16 at its full draw position with the alignment bar 58. Such a properly aligned shot is illustrated in FIG. 7 shown from the archer's point of view.

Even with a properly calibrated sighting system, such as the sighting system 10 described above, an archer 31 must select the proper target distance. Traditionally, this selection of target distance is an estimation based on a visual observation of the target and previous experience as to the distance to the target. As one skilled in the art will appreciate, this estimation process leads to inaccurate target distance selection and inaccurate shots because of varying levels of experience, eyesight, and other relevant factors.

Figure 8:
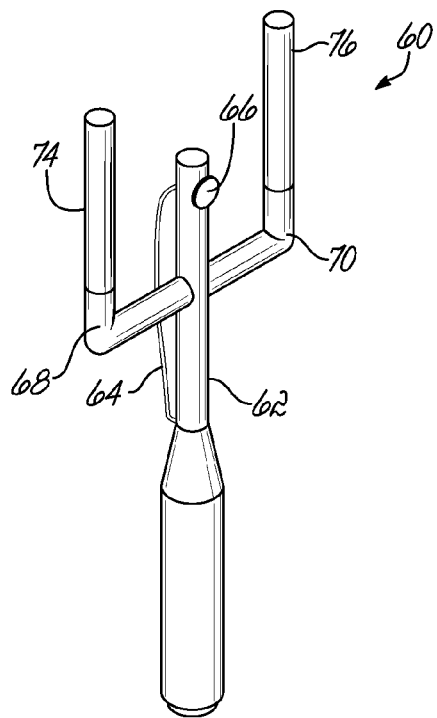
FIG. 8 is a front perspective view of a range finder in accordance with an embodiment of the invention.

To address such a shortcoming, a range finder 60, adapted to assist an archer 31 in determining the distance to a target, may be utilized. One embodiment of a range finder 60 is illustrated in FIG. 8 and includes a pin 62 adapted to attach to a bow 12, a brightly colored wire 64 disposed through the pin 62 at a front focus point 66, and a first yardage bar 68 and a second yardage bar 70 attached to opposing sides of the pin 62. The range finder 60 improves upon a regular sighting pin 24 by allowing an archer 31 to more accurately estimate the distance to his target. In this regard, the archer 31 can align known features of a target with the position of the first and second yardage bars 68, 70 to estimate an accurate distance to the target. Furthermore, ends 74, 76 of the respective yardage bars 68, 70 are painted a bright contrasting color such as white so that the yardage bars 68, 70 stand out against a target or background. Such an exemplary use of the range finder 60 will now be discussed in more detail.

Figure 9A:
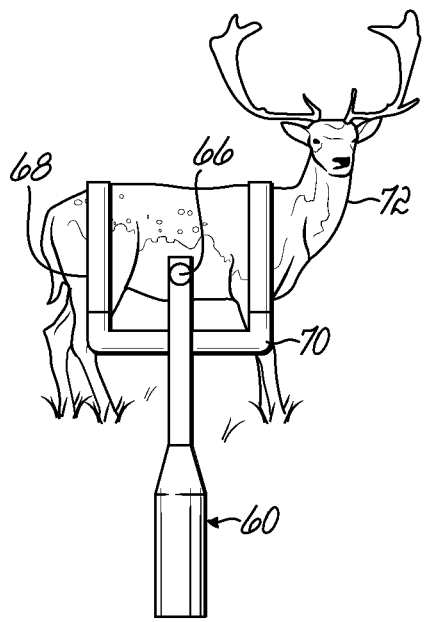
FIG. 9A is a front view of the range finder of FIG. 8, where the yardage bars align with the front and back legs of a target deer.
Figure 9B:
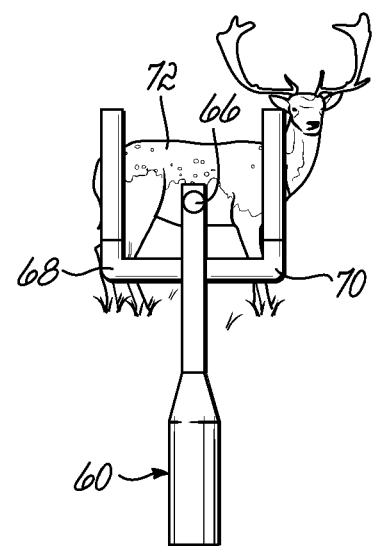
FIG. 9B is a view similar to FIG. 9A, where the yardage bars align with the neck and rear end of a target deer.
Figure 9C:
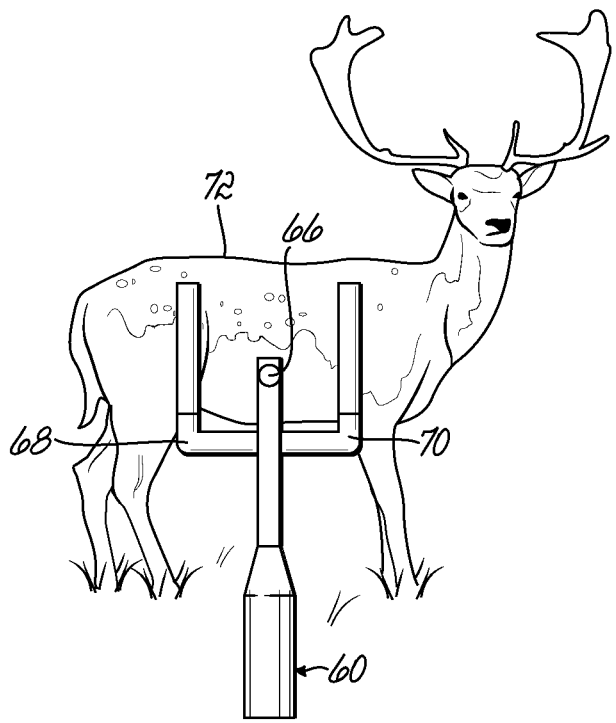
FIG. 9C is a view similar to FIG. 9A, where the yardage bars align within the front and back legs of a target deer.
Figure 9D:
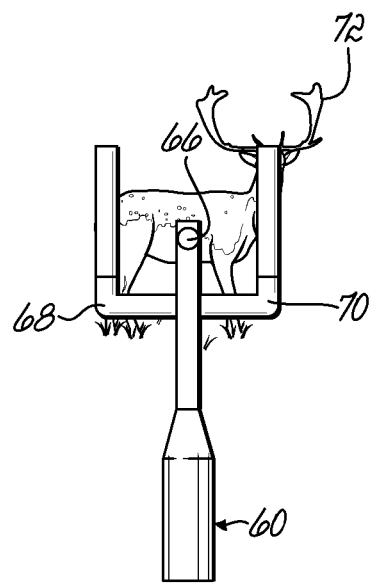
FIG. 9D is a view similar to FIG. 9A, where the yardage bars align with the nose and tail of a target deer.

In one illustrative example where the target is a deer, the yardage bars 68, 70 are shown in FIGS. 9A-9D corresponding to various distances of the target deer 72. Typically, the distance between the front and back legs of an adult deer is approximately a constant. As a result, this spacing may be used as a reference length to estimate the distance to the deer. For example, when a deer 72 is viewed broadside through the range finder 60 as shown, the yardage bars 68, 70 are designed to line up with the front and back legs of the deer 72 when the deer 72 is approximately 30 yards away, as shown in FIG. 9A. At a longer distance such as about 45 yards, the front and back legs line up just within the yardage bars 68, 70 as illustrated in FIG. 9B. At a shorter distance such as approximately 15 yards, the yardage bars 68, 70 are designed to line up within the front and back legs as shown in FIG. 9C. When the target deer 72 is about 60 yards away from the archer, the head and tail line up with the yardage bars 68, 70 as illustrated in FIG. 9D.

While range finder 60 is described in reference to a target deer 72 and the yardage bars 68, 70 are configured to relate to the reference length on the target (e.g., distance between front and back legs) for distances of approximately 30 yards, 45 yards, 15 yards, and 60 yards in FIGS. 9A-9D, these are merely exemplary. Those of ordinary skill in the art will recognize how to configure range finder 60 for various targets, reference lengths, and/or desired distances corresponding to the appearance of the target in the range finder 60. Thus, aspects of the invention are not limited to the applications specifically shown and described herein.

The range finder 60 may be used as a stand alone device separate from the bow, gun, or other weapon. Alternatively, the range finder 60 may be coupled to these weapons and used when estimating the distance to the target. In still another embodiment, the range finder 60 may be incorporated into the sighting system of a weapon. In one embodiment, the range finder 60 described may be used on any archery system with a single-pin sighting system to replace the sighting pin 24. Moreover, the range finder 60 could be incorporated as one of a plurality of sighting pins 24 in a multi-pin sighting system (not shown).

Figure 10:
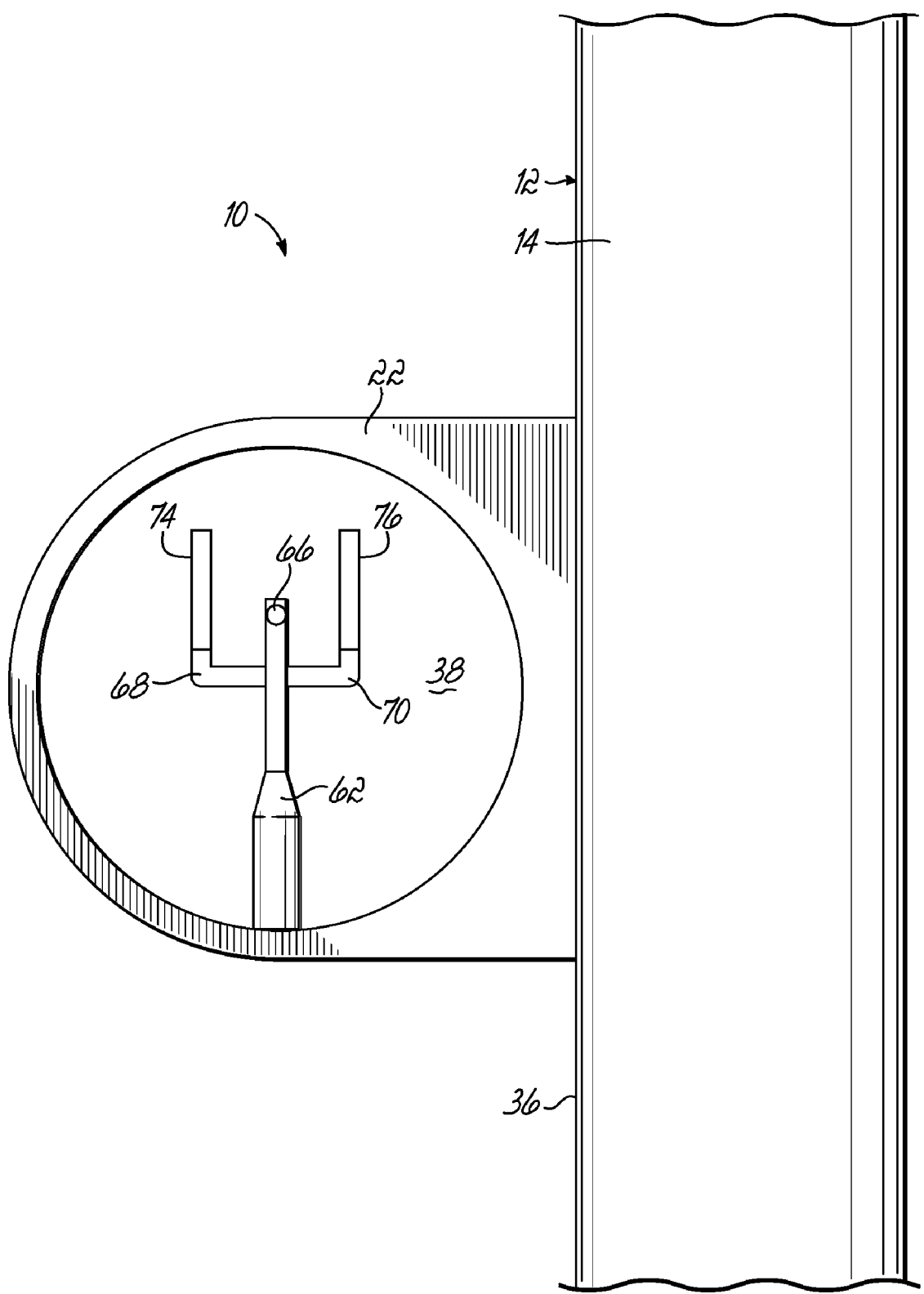
FIG. 10 is a front view of the range finder of FIG. 8 incorporated in the sighting system of FIG. 1.

For example, as shown in FIG. 10, the range finder 60 may be incorporated with the sighting system 10 described above and shown in FIG. 2. In this embodiment, the range finder 60 is disposed within sight body 22 and is used when an archer 31 looks at a target through sighting window 38. The range finder 60 defines a front focus point 66, just like the sighting pin 24 in previous embodiments. This allows for the operation of aiming and shooting with the plurality of contact knocks 26 in a manner similar to that described above. Unlike the previous embodiment, however, an archer 31 may now estimate the distance to the target prior to taking the shot. For example, an archer 31 looking through the range finder 60 could see that a target deer's legs line up within yardage bars 68, 70 as shown in FIG. 9C. The archer 31 can then quickly determine that the target distance is approximately 15 yards and aim the shot by placing his reference feature 32 on or relative to the appropriate contact knock 26 that corresponds to this distance. This rapid process allows for quick and accurate shot selection.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A sighting system for use with an archery bow having a bow body and a bow string, the sighting system comprising:
    a sighting pin adapted to be coupled to the bow body and defining a front focus point; and
    a plurality of contact knocks adapted to be coupled to the bow string,
    wherein an archer adjusts the distance of a shot by locating a reference feature on the archer relative to one of said contact knocks while keeping said sighting pin on a target.

2. The sighting system of claim 1, wherein said contact knock comprises:
    a knock body; and
    an aperture formed in said knock body and adapted to snugly receive the bow string therethrough.

3. The sighting system of claim 2, wherein said knock body is formed from a resilient rubber material.

4. The sighting system of claim 2, wherein said contact knock further comprises:
    a tightening pin; and
    a tightening string disposed through said knock body and around said tightening pin, said tightening string adapted to tighten said contact knock on the bow string when said tightening string is tensioned.

5. The sighting system of claim 4, wherein said plurality of contact knocks share a common tightening string.

6. The sighting system of claim 1, wherein said sighting system further comprises:
    an alignment bar spaced from said bow body and adjacent to said sighting pin.

7. An archery bow, comprising:
    a bow body;
    a bow string adapted to be coupled to said bow body; and
    a sighting system, wherein the sighting system comprises:
        a sighting pin coupled to the bow body and defining a front focus point; and
        a plurality of contact knocks coupled to the bow string, wherein an archer adjusts the distance of a shot by locating a reference feature on the archer relative to one of said contact knocks while keeping said sighting pin on a target.

8. The archery bow of claim 7, wherein said contact knock comprises:
    a knock body; and
    an aperture formed in said knock body and adapted to snugly receive the bow string therethrough.

9. The archery bow of claim 8, wherein said knock body is formed from a resilient rubber material.

10. The archery bow of claim 8, wherein said contact knock further comprises:
    a tightening pin; and
    a tightening string disposed through said knock body and around said tightening pin, said tightening string adapted to tighten said contact knock on the bow string when said tightening string is tensioned.

11. The archery bow of claim 10, wherein said plurality of contact knocks share a common tightening string.

12. The archery bow of claim 7, wherein said sighting system further comprises:
    an alignment bar spaced from said bow body and adjacent to said sighting pin.

\* \* \* \* \*